US009239816B2

(12) United States Patent
Jin et al.

(10) Patent No.: US 9,239,816 B2
(45) Date of Patent: Jan. 19, 2016

(54) METHOD OF POWER SYSTEM PREVENTIVE CONTROL CANDIDATE MEASURES IDENTIFICATION SELF-ADAPTIVE TO EXTERNAL ENVIRONMENT

(75) Inventors: Xuecheng Jin, Jiangsu (CN); Haohao Wang, Jiangsu (CN); Zhuxiang Yao, Jiangsu (CN); Taishan Xu, Jiangsu (CN); Genhua Zou, Jiangsu (CN); Bijun Li, Jiangsu (CN); Jianhua Xiong, Jiangsu (CN); Wei Xu, Jiangsu (CN); Feng Wen, Jiangsu (CN); Huimin Peng, Jiangsu (CN)

(73) Assignees: JIANGXI ELECTRIC POWER COMPANY (CN); STATE GRID ELECTRIC POWER RESEARCH INSTITUTE (CN)

( * ) Notice: Subject to any disclaimer, the term of this patent is extended or adjusted under 35 U.S.C. 154(b) by 421 days.

(21) Appl. No.: 13/877,180

(22) PCT Filed: Oct. 17, 2011

(86) PCT No.: PCT/CN2011/080832
§ 371 (c)(1),
(2), (4) Date: Apr. 11, 2013

(87) PCT Pub. No.: WO2012/071953
PCT Pub. Date: Jun. 7, 2012

(65) Prior Publication Data
US 2013/0246000 A1    Sep. 19, 2013

(30) Foreign Application Priority Data

Dec. 1, 2010   (CN) .......................... 2010 1 0568150

(51) Int. Cl.
*G06F 17/18*    (2006.01)
*G05B 23/02*    (2006.01)
*G06Q 10/06*    (2012.01)

(52) U.S. Cl.
CPC ............ *G06F 17/18* (2013.01); *G05B 23/0289* (2013.01); *G06Q 10/06* (2013.01)

(58) Field of Classification Search
CPC .. G06F 17/18; G05B 23/024; G05B 23/0216; G05B 23/0289; G06Q 10/06; H02H 7/28; H02J 3/00

USPC ................................................. 702/179, 181
See application file for complete search history.

(56) References Cited

U.S. PATENT DOCUMENTS

| 6,219,590 B1 * | 4/2001 | Bernaden, III ...... F24F 11/0086 700/277 |
| 7,729,882 B2 * | 6/2010 | Seem ................... G05B 23/024 700/276 |
| 2008/0183424 A1 | 7/2008 | Seem |

FOREIGN PATENT DOCUMENTS

| CN | 1256465 A | 6/2000 |
| CN | 1835336 A | 9/2006 |
| CN | 101976827 A | 2/2011 |

OTHER PUBLICATIONS

International Search Report; PCT/CN2011/080832; Int'l File Date: Oct. 17, 2011; Jiangxi Electric Power Company et al.; 3 pages.

*Primary Examiner* — An Do
(74) *Attorney, Agent, or Firm* — Schmeiser, Olsen & Watts, LLP

(57) ABSTRACT

A method of power system preventive control candidate measures identification self-adaptive to external environment, which is applicable to dynamic identification of stations and power equipment under the effect of calamity, and judgment of preventive control measures that lose or restore control capability, and those for which control range or cost has changed. Automatic online identification of set of preventive control candidate measures includes two tasks: identification of stations and power equipment under the effect of calamity, and adjustment of the space of preventive control measures. According to information of power transmission line fault probability due to calamity, online dynamic quantitative assessment of stations and equipment is performed under the effect of external environment, and automatically correct control range and control cost of the measures according to the effect on equipment, so that the result of preventive control adapts to real-time external environment, ensuring feasibility and economy of auxiliary decision making.

4 Claims, 1 Drawing Sheet

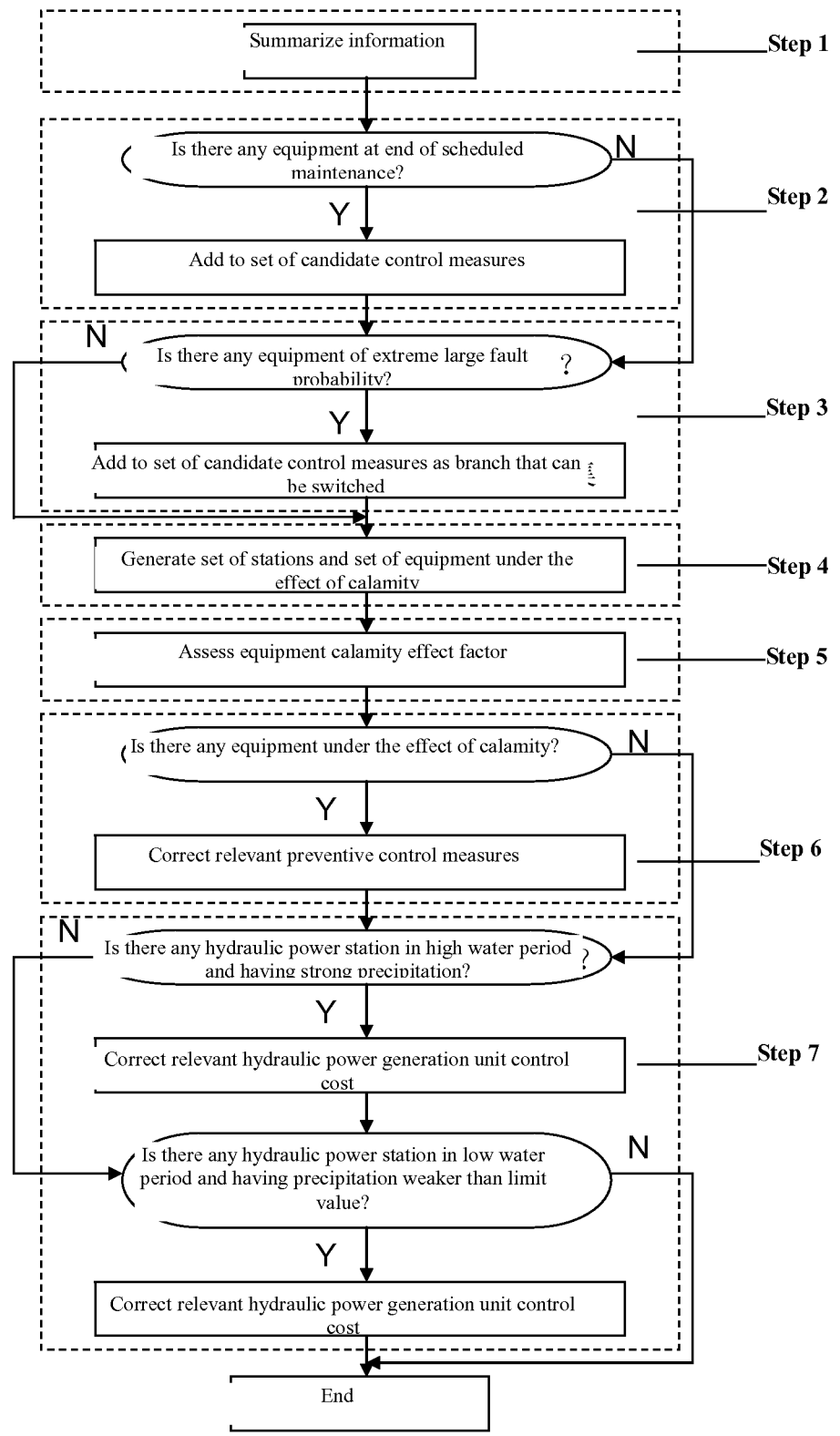

METHOD OF POWER SYSTEM PREVENTIVE CONTROL CANDIDATE MEASURES IDENTIFICATION SELF-ADAPTIVE TO EXTERNAL ENVIRONMENT

FIELD OF TECHNOLOGY

The following belongs to the technical field of power system and its automation.

BACKGROUND

Normally, online safety and stability defense systems of Chinese grids (state grid and province grids) feature online preventive control assistant decision making functions for safety and stability of power grids. These functions automatically search preventive control measures that restore system safe status at minimum cost from specified set of candidate preventive control measures (control equipment, control range, and control cost) according to grid real-time operating conditions and results of safety and stability assessment of the grid, so as to allow preventive control assistant decision making by dispatchers.

In present online defense systems, basically fixed set of candidate control measures specified in advance is used. In the environment of external calamity, control capability and control cost of candidate control measures may vary. If existing set of candidate measures is still used, result of preventive control decision may not be economic and even feasible, so that effective preventive control assistant decision making is not available to dispatchers.

At present, some research organizations have studied effect of natural calamities (e.g. typhoon, lighting, and ice covering) on power equipment, particularly fault probability of power transmission lines, and developed related probability assessment technique. This has laid a good foundation for assessment of effect of calamities on equipment inside stations (units and buses etc.) and dynamic adjustment of the set of candidate control measures.

SUMMARY

The purpose of this invention is to overcome the disadvantage of fixed set of candidate control measures of difficult adaptation to change of external environment, and provide a method of dynamic identification and adjustment of the set of candidate control measures according to external calamity.

This invention assesses extent of effect of calamity on controlled objects according to topological connection relations of lines and stations under the effect of calamity, in combination with power equipment fault probabilities. For controlled objects seriously affected by calamity, this invention modifies their control range; and for controlled objects subject to light effect of calamity, this invention reasonably modified their control cost, and provide reasonable and feasible set of candidate control measures for preventive control, so that preventive control assistant decision making can satisfy requirements by grid safe and economic operation.

In particular, this invention is implemented using the following technical scheme, including the following steps:

1) collecting power transmission line fault probability assessment result in current period of time, maintenance plan information, information of equipment of non-scheduled shutdown, and candidate control measures set used for normal environment at the control center;

2) Judging primary equipment (lines and transformers etc.) that is at end of maintenance and can be put into operation according to information of scheduled maintenance, and adding such equipment to the candidate control measures set;

3) Adding equipment under the effect of calamity to the candidate control measures set if fault probability or collective fault probability of such equipment exceeds a certain limit;

4) In case line fault probability is identified as exceeding a certain setting according to results of line fault probability assessment, automatically adding stations (power plants or substations) at both ends of the line to the set of stations under the effect of calamity, and adding units and buses in these stations to the set of equipment under the effect of calamity; and if units in a power station are connected to different voltage levels, regarding units of the same voltage level as one power station, i.e. dividing this power station into a number of power stations according to voltage levels for independent processing;

5) According to grid topological connection relations, set of equipment of non-scheduled shutdown, and set of equipment of scheduled maintenance, for $N_s$ stations under the effect of calamity, let $i=1 \ldots N_s$, obtaining statistics of total number $L_{ni}$ of lines connected to the affected station i, total number $L_{di}$ of lines among them under the effect of calamity, total number $L_{oi}$ of lines of non-scheduled shutdown (for these lines, fault probability can be deemed 1), and total number $L_{pi}$ of lines of scheduled maintenance; calculating total fault probability of lines under the effect of calamity $$\alpha_{di} = \sum_{j=1}^{L_{di}} \alpha_j^i,$$

where $\alpha_j^i$ is the fault probability of line j connected to station i; and calculating calamity effect factor $$\gamma_i = \frac{\alpha_{di} + L_{oi}}{L_{ni} - L_{pi}}$$

of affected station i;

6) Setting calamity effect factor of all units in a power station to the calamity effect factor of this power station, and setting calamity effect factor of all buses in a substation to the calamity effect factor of this substation; and if calamity effect factor of a unit or bus exceeds a certain setting $\beta_1$, deeming such equipment as under the effect of calamity and going to step 7); otherwise going to step 10);

7) For the $i^{th}$ equipment item $D_i$ under the effect of calamity, if its calamity effect factor $\gamma_i$ exceeds a certain relatively large threshold $\beta_2$ ($\beta_2 > \beta_1$), going to step 8); if it is smaller than $\beta_2$ but larger than $\beta_1$, going to step 9);

8) Setting output control upper limit of $D_i$ related unit to current output of the unit, leaving output control lower limit unchanged, and no longer reducing $D_i$ related load; setting $D_i$ related capacitor/reactor control measures to invalid; and if handling of equipment under the effect of calamity is complete, going to step 7); otherwise going to step 10);

9) Obtaining $D_i$ related unit output upward control cost by $C_{di} = k_{di} C_{di0}$ (where $k_{di}$ is correction factor and $k_{di} > 1$, and $C_{di0}$ is the upward control cost under normal conditions), leaving downward control cost unchanged, and multiplying $D_i$ related load downward control cost and $D_i$ related capacitor/reactor control cost by the same correction factor $k_{di}$ for correction; if handling of equipment under the effect of calamity is complete, going to step 7); otherwise going to the next step; and 10) Detecting whether there is a hydraulic power station in high water period and having daily precipitation exceeding a certain limit, and if positive, multiplying downward control cost of units of this power station by a correction factor $k_{di}$ (which exceeds 1 and changes with precipitation); detecting whether there is a hydraulic power station in low water period and having daily precipitation less than a certain limit, and if positive, multiplying normal value of upward control cost of units of this power station by a correction factor $k'_{di}$ (which exceeds 1 and changes with precipitation).

Beneficial effects of this invention: The method of this invention can comprehensively consider various information sources, e.g. effect of external calamities (typhoon, lightning, and ice covering etc.) on grid equipment, information of scheduled maintenance, and weather information etc., and perform online dynamic adjustment of the candidate control measures set, so as to effectively improve adaptation of the preventive control assistant decision making functions to external environment and grid operating conditions, and economy and feasibility of assistant decision making results.

BRIEF DESCRIPTION OF DRAWINGS

FIG. 1 is a flow chart of the method of this invention.

DETAILED DESCRIPTION

The following describes method of this invention in details in combination with FIG. 1.

Step 1 in FIG. 1 is collection of power transmission line fault probability assessment result in current period of time, maintenance plan information, information of equipment of non-scheduled shutdown, and candidate control measures set used for normal environment at the control center.

Step 2 in FIG. 1 is judgment of primary equipment (lines and transformers etc.) that is at end of maintenance and can be put into operation according to information of scheduled maintenance, and addition of such equipment to the candidate control measures set.

Step 3 in FIG. 1 is addition of equipment under the effect of calamity to the candidate control measures set if fault probability or collective fault probability of such equipment exceeds a certain limit.

Step 4 in FIG. 1 is automatic addition of stations at both ends of the line to the set of stations under the effect of calamity, and addition of units and buses in these stations to the set of equipment under the effect of calamity in case line fault probability is identified as exceeding a certain setting according to results of line fault probability assessment; and if units in a power station are connected to different voltage levels, regarding units of the same voltage level as one power station, i.e. dividing this power station into a number of power stations according to voltage levels for independent processing.

Step 5 in FIG. 1 is: according to grid topological connection relations, set of equipment of non-scheduled shutdown, and set of equipment of scheduled maintenance, for $N_s$ stations under the effect of calamity, let i=1 . . . $N_s$, obtaining statistics of total number $L_{ni}$ of lines connected to the affected station i, total number $L_{di}$ of lines among them under the effect of calamity, total number $L_{oi}$ of lines of non-scheduled shutdown (for these lines, fault probability can be deemed 1), and total number $L_{pi}$ of lines of scheduled maintenance; calculating total fault probability of lines under the effect of calamity $$\alpha_{di} = \sum_{j=1}^{L_{di}} \alpha^i_j,$$

where $\alpha^i_j$ is the fault probability of line j connected to station i; and calculating calamity effect factor $$\gamma_i = \frac{\alpha_{di} + L_{oi}}{L_{ni} - L_{pi}}$$

of affected station i. In addition, calamity effect factor of all units in a power station is set to the calamity effect factor of this power station, and calamity effect factor of all buses in a substation to the calamity effect factor of this substation; and if calamity effect factor of equipment exceeds a certain setting $\beta_1$, step 6) will be entered; otherwise step 7) will be entered.

Step 6 in FIG. 1 is: correction of preventive control measures according to change of calamity effect factor. For $N_d$ items of equipment under the effect of calamity, let i=1 . . . $N_d$. Take calamity effect factor $\gamma_i$ of the $i^{th}$ equipment item $D_i$ under the effect of calamity in sequence. If $\beta_1 < \gamma_i < \beta_2$, output upward control cost of unit related to $D_i$ is $C_{di} = k_{di} C_{di0}$ (where $k_{di}$ is the correction factor, $k_{di} > 1$, and $C_{di0}$ is upward control cost under normal conditions), downward control cost remains unchanged, and downward control cost of load related to $D_i$ and control cost of capacitor/reactor related to $D_i$ are multiplied by the same correction factor $k_{di}$ for correction. If $\gamma_i \geq \beta_2$, output control upper limit of unit related to $D_i$ is set to current output of the unit, control lower limit remains unchanged, load related to $D_i$ is no longer reduced, and capacitor/reactor control measures related to $D_i$ are set to invalid.

Step 7 in FIG. 1 is: Detection of hydraulic power station in high water period and having daily precipitation exceeding a certain limit. If positive, multiply downward control cost of such hydraulic power station units by factor $k_{di}$; for example:

$$k_{di} = \begin{cases} 1.1 & 25 \leq R < 50 \\ 1.2 & 50 \leq R < 100 \\ 1.3 & 100 \leq R < 200 \\ 1.5 \ R/200 & 200 \leq R \end{cases}$$

where $R$ is daily precipitation (in mm).

Also, detection of hydraulic power station in low water period and having daily precipitation less than a certain limit; if positive, multiply normal value of upward control cost of such hydraulic power station units by correction factor $k'_{di}$ ($k_{di}$ exceeds 1 and changes with precipitation).

What is claimed is:
1. A method of power system preventive control candidate measures identification self-adaptive to external environment, including the following steps:
 a) collecting a power transmission line fault probability assessment result in a current period of time, a mainte- nance plan information, an information of equipment of non-scheduled shutdown, and a plurality of candidate control measures set for a normal environment at the control center;

b) judging primary equipment that is at an end of maintenance and is put into operation according to information of scheduled maintenance, and adding the primary equipment to the plurality of candidate control measures set;

c) adding equipment under an effect of calamity to the plurality of candidate control measures set if fault probability or collective fault probability of the equipment exceeds a certain limit;

d) in case line fault probability is identified as exceeding a certain setting according to the results of line fault probability assessment, automatically adding a plurality of stations at both ends of the line to the plurality of stations under the effect of calamity, and adding units and buses in the plurality of stations to the equipment under the effect of calamity; and if units in a power station are connected to different voltage levels, regarding units of the same voltage level as one power station, dividing the power station into a number of power stations according to voltage levels for independent processing;

e) according to grid topological connection relations, the equipment of non-scheduled shutdown, and the equipment of scheduled maintenance, for stations under the effect of calamity, obtaining statistics of a total number of lines connected to each station, a total number of lines among them under the effect of calamity, a total number of lines of non-scheduled shutdown, and a total number of lines of scheduled maintenance, and calculating a sum of fault probability of lines connected to each station under the effect of calamity and calculating calamity effect factor of this station based on this calculation;

f) setting a calamity effect factor of all units in the power station to the calamity effect factor of the power station, and setting a calamity effect factor of all buses in a substation to the calamity effect factor of the substation, and if a calamity effect factor of a unit or bus exceeds a certain setting $\beta_1$, deeming the equipment as under the effect of calamity and going to step g), otherwise going to step j);

g) selecting equipment under the effect of calamity one by one, and if the calamity effect factor of an equipment item exceeds a certain larger threshold $\beta_2$, going to step h), if this factor is smaller than $\beta_2$ but larger than $\beta_1$, going to step i), h) setting an output control upper limit of a relevant unit to a current output of the unit, leaving the output control lower limit unchanged, and no longer reducing a relevant load, setting a relevant capacitor/reactor control measures to invalid, and if handling of the equipment under the effect of calamity is complete, going to step g), otherwise going to step j);

i) multiplying a normal value of an upward control cost of the relevant unit by a correction factor, which exceeds 1, leaving a downward control cost unchanged, and using the same correction factor to correct the normal value of the downward control cost of the relevant load and the normal value of the control cost of relevant capacitor/reactor, if handling of the equipment under the effect of calamity is complete, going to step g), otherwise going to step j); and j) detecting whether there is a hydraulic power station in a high water period and having daily precipitation exceeding a certain limit, and if positive, multiplying the normal value of the downward control cost of units of the power station by a correction factor, which exceeds 1 and changes with precipitation, detecting whether there is a hydraulic power station in a low water period and having daily precipitation less than a certain limit, and if positive, multiplying the normal value of the upward control cost of units of the power station by a correction factor, which exceeds 1 and changes with precipitation.

2. A method according to claim 1, wherein primary equipment are lines and transformers.

3. A method according to claim 1, wherein step h) no longer increases output of unit related to an equipment item under the effect of calamity if its calamity effect factor exceeds a certain relatively large limit $\beta_2$, that is to say, sets output control upper limit of the unit to current output of the unit, leaves output control lower limit unchanged, and no longer reduces load relevant to this equipment item; and sets capacitor/reactor control measures relevant to this equipment item to invalid.

4. A method according to claim 1, wherein step i) multiples normal value of upward control cost of relevant unit by a correction factor, which exceeds 1, leaves downward control cost unchanged, and uses the same correction factor to correct normal value of downward control cost of relevant load and normal value of control cost of relevant capacitor/reactor for an equipment item under the effect of calamity if its calamity effect factor is less than $\beta_2$ but larger than $\beta_1$.

* * * * *